United States Patent

Gerresheim et al.

[11] Patent Number: 5,996,661
[45] Date of Patent: Dec. 7, 1999

[54] VEHICLE TIRE

[75] Inventors: Manfred Gerresheim, Obertshausen-Hausen; Saburo Miyabe, Hanau; Dieter Glotzbach, Maintal; Joachim Riegel, Linsengericht, all of Germany

[73] Assignee: Dunlop GmbH, Hanau, Germany

[21] Appl. No.: 09/034,006

[22] Filed: Mar. 3, 1998

[30] Foreign Application Priority Data

Mar. 3, 1997 [DE] Germany ............................ 197 08 612

[51] Int. Cl.⁶ ............................ B60C 11/03; B60C 115/00
[52] U.S. Cl. .................................. 152/209.22; 152/209.28
[58] Field of Search ........................ 152/209.18, 209.22, 152/209.27, 209.28, 903; D12/142, 144, 146, 147, 148

[56] References Cited

U.S. PATENT DOCUMENTS

| | | |
|---|---|---|
| D. 342,047 | 12/1993 | Takahashi . |
| D. 389,791 | 1/1998 | Himuro . |
| 4,424,843 | 1/1984 | Fontaine . |
| 4,424,844 | 1/1984 | Fontaine . |
| 4,456,046 | 6/1984 | Miller . |
| 5,234,042 | 8/1993 | Kuhr et al. . |
| 5,421,391 | 6/1995 | Himuro . |
| 5,423,364 | 6/1995 | Himuro . |
| 5,435,364 | 7/1995 | Hasegawa et al. . |
| 5,746,849 | 5/1998 | Hutson et al. . |
| 5,851,322 | 12/1998 | Hayashi . |

FOREIGN PATENT DOCUMENTS 4239475   5/1994   Germany .

*Primary Examiner*—Steven D. Maki
*Attorney, Agent, or Firm*—Birch, Stewart, Kolasch & Birch, LLP

[57] ABSTRACT

A vehicle tire having a directionally bound tread pattern is described in which an inner circumferential groove is provided on both sides of a central circumferential rib and in each case has a smaller width than the circumferential rib, and in which an intermediate tread zone is in each case formed between the inner circumferential groove and the respective outer circumferential groove in which oblique grooves are provided which are curved in an arc-shaped manner in the direction of the shoulder regions.

8 Claims, 2 Drawing Sheets

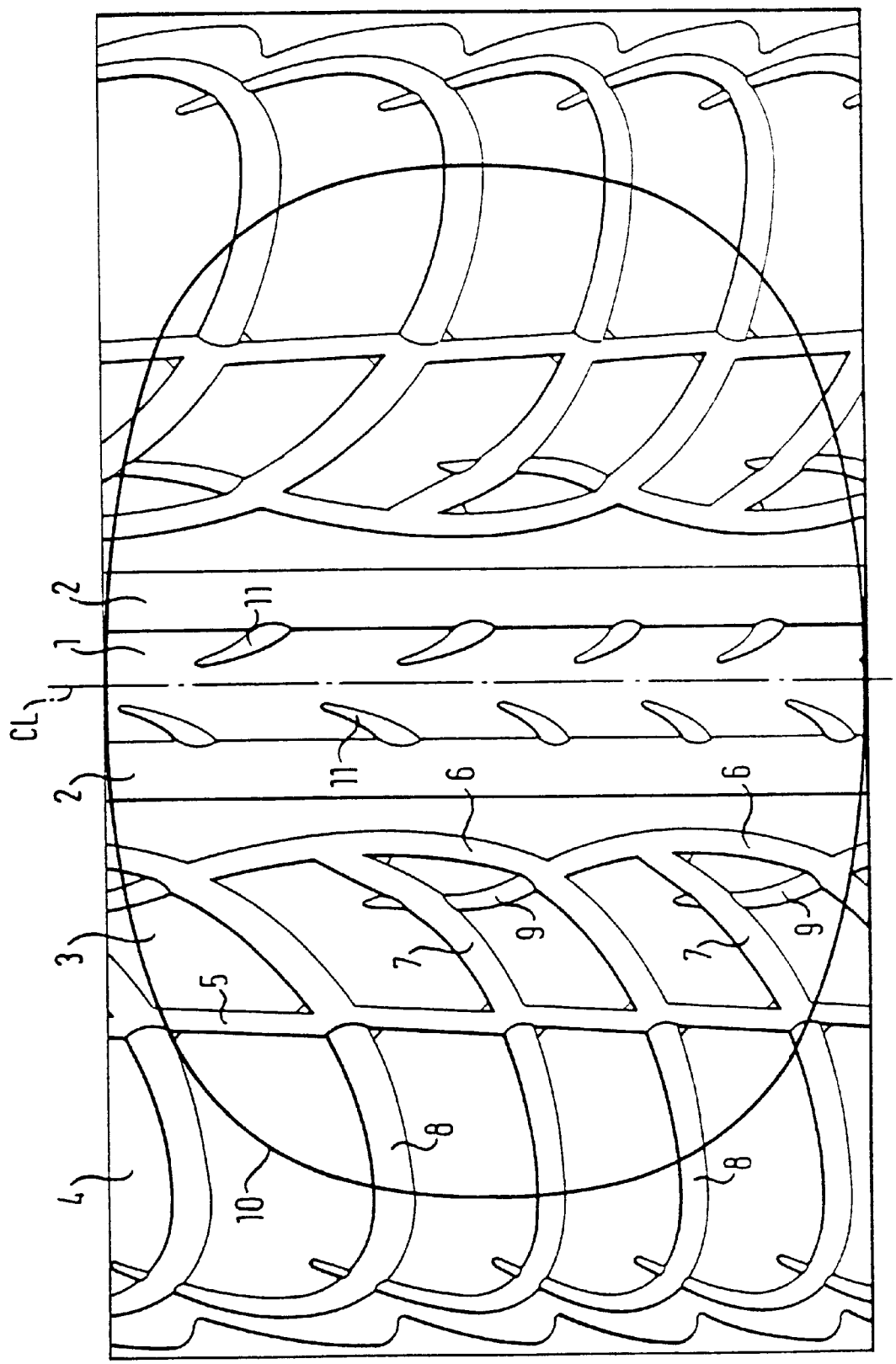

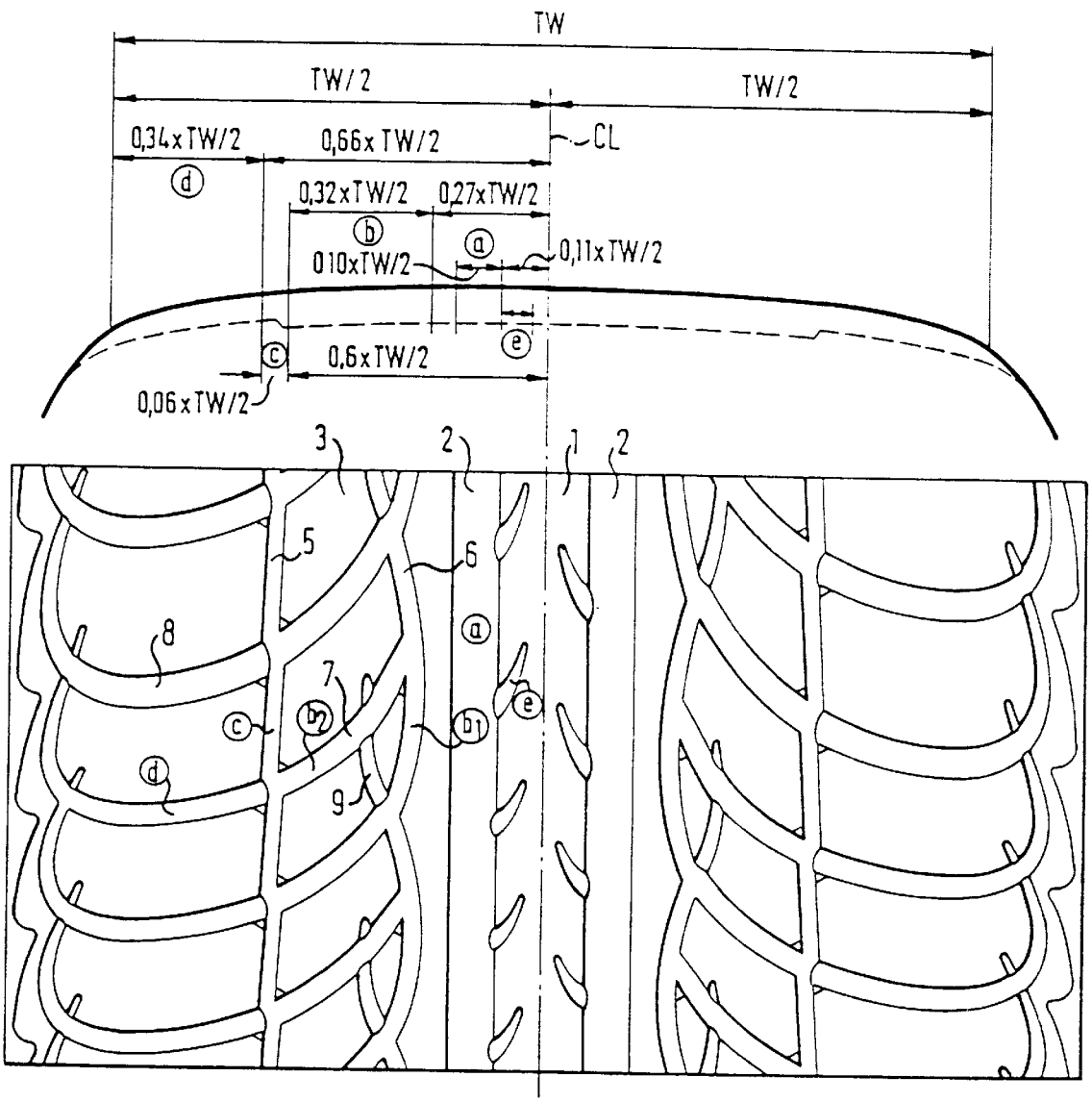

VEHICLE TIRE

The invention relates to a vehicle tire having a tread with a directionally bound tread pattern.

A problem in known air tires with circumferential grooves is that a pronounced, so-called organ pipe whine arises, which has a typical frequency in the range from 900 Hz to 1100 Hz and which is very undesirable in regard to the otherwise diminishing vehicle noises. The circumferential grooves, which are the cause of this noise development, ensure in return a good aquaplaning behavior of the respective tire, which means that the requirement of noise reduction on the one hand and of a good aquaplaning behavior on the other hand are contradictory.

The object of the invention is to form a vehicle tire of the initially stated type in such a manner that, on the one hand, the disturbing noise development in the frequency range from 900 Hz to 1100 Hz is at least strongly minimized and, on the other hand, the aquaplaning behavior is not thereby impaired.

This object is satisfied in accordance with the invention substantially in that an inner circumferential groove is provided on both sides of a central circumferential rib and in each case has a smaller width than the circumferential rib, in that an intermediate tread zone is in each case formed between these inner circumferential grooves and outer circumferential grooves disposed in the shoulder transition region and having a smaller width than the inner circumferential groove, wherein oblique grooves which are curved in an arc-shaped manner in the direction of the shoulder regions are provided, which, on the one hand, open into the outer circumferential grooves and, on the other hand, communicate with the respective oblique groove of like design, which follows in the direction of running.

The circumferential grooves present in the central region have a very small groove width in comparison with the total tread width so that a disturbing organ pipe whine in the region of the tire contact patch at least substantially does not arise, and it is ensured by the oblique grooves formed in the intermediate tread zone that different groove inclinations always result when the tire contact patch is traversed, which leads to a reduction in the noise. Nevertheless a good water drain-off is achieved in the region of the tire contact patch since in the central region, which has a relatively small width, the water drain-off is possible via the narrow circumferential grooves and, through the subdivision of the intermediate tread zone by means of the oblique grooves, which are open to the outside in the tread contact patch, an equally good water drain-off is also achieved in the direction towards the shoulder regions.

Further advantageous features of the invention are set forth in the subordinate claims and in the following description of an exemplary embodiment.

The drawings, which relate to the exemplary embodiment, show in

FIG. 1 a plan view onto the tread contact patch of a tire in accordance with the invention, and FIG. 2 a plan view onto a partial region of the tire in accordance with FIG. 1, with the associated tire cross-section contour containing positioning data in reference to the tread width being shown associated with and above this illustration.

The design of the tread pattern of the tire shown in FIG. 1 in the form of a tread section comprises a central circumferential rib 1 to which in each case an inner circumferential groove 2 adjoins on both sides. These circumferential grooves 2 have a width which is smaller than that of the central circumferential rib 1.

An intermediate tread zone 3 adjoins at the circumferential groove 2 in each case in the direction towards the tire shoulders and merges into the shoulder region 4. Between the shoulder region 4 and the intermediate tread zone there extends an outer circumferential groove 5 which consists of sections which are displaced with respect to one another in the direction of the tire width so that this outer circumferential groove 5 at least largely loses its character as a pure circumferential groove. This outer circumferential groove 5 has a smaller width than the inner circumferential groove 2.

In the intermediate tread zone, oblique grooves 6 are provided which are curved in an arc-shaped manner in the direction of the shoulder regions 4 and which, on the one hand, open into the outer circumferential grooves 5 and, on the other hand, communicate with the respective oblique groove 6, which is formed with like design and follows in the direction of running. At each location where an oblique groove 6 merges into the following oblique groove, it continues in the shape of a curved groove end 9 which characterizes the direction of running and of which the depth decreases to zero, which means that this groove end 9 is substantially without function with respect to the tire properties.

Between two oblique grooves 6 of like design, an arc-shaped intermediate groove 7 is provided in each case which extends with a curvature similar to that of the oblique grooves 6 between an inwardly lying oblique groove section and an outer circumferential groove 5. These intermediate grooves are intersected by the groove ends 9.

At those locations at which the mutually slightly displaced sections of the outer circumferential grooves 5 meet one another, the oblique grooves 6 and the intermediate grooves 7 open into this outer circumferential groove 5 and continue into the shoulder region 4 in the shape of curved shoulder grooves 8 which subtend an angle of about 70° to 90° to the central plane of the tire CL in their region of action. Their ends, which diminish with respect to their depths to the value zero, are curved off, extend in a direction similar to that of the groove ends 9 and likewise have only a function characterizing the direction of running.

The central circumferential rib 1 is provided with curved and relatively short blind grooves 11 which are mutually displaced in the circumferential direction and which lead to a breaking up of this circumferential rib 1.

The tire contact patch which results during use is designated by the reference numeral 10. Within this tire contact patch 10 there are no closed groove areas, which means that all grooves entering into the contact patch can contribute to the drainage so that the requirement of good aquaplaning behavior is fulfilled and that the noise production can also be minimized as a result of the oblique extension of the majority of the grooves and of the circumferential grooves, which have a small width.

With reference to the preferred exemplary embodiment FIG. 2 shows the dimensional relationships between the various grooves and the circumferential rib and their arrangements or positionings relative to the tread width.

The tread width TW extends between the points of intersection of a straight line extending corresponding to the tread and tangents which are placed at the tire shoulders.

With respect to the grooves, which are designated in FIG. 2 by a, $b_1$, $b_2$, c, d, e, the values given in the following table result with respect to the extent of the range, the distance from the central plane of the tire $C_L$, the groove width and the groove angle.

| Groove | a | $b_1$ | $b_2$ | c | d | e |
|---|---|---|---|---|---|---|
| Range $[x^{TW}/2]$ | 0.10 | 0.32 | | 0.06 | 0.34 | 0.07 |
| Distance - $C_L$ $[x^{TW}/2]$ | 0.11 | 0.27 | | 0.6 | 0.66 | 0.04 |
| Groove width $[x^{TW}/2]$ | 0.10 | 0.04~0.006 | 0.06 | 0.04 | 0.06~0.08 | 0.01~0.05 |
| Groove angle $[x^{TW}/2]$ | 0 | 0°~70° | 30°~70° | 0° with 3° off-set | 70°~90° | 10°~40° |

The values given in the table are preferred values, but deviations from these values may occur provided that the basic concept of the described design of the tread pattern is retained. Deviations in the range of ±10% are possible without departing from the basic idea of the invention.

Having now described our invention what we claim is:

1. A vehicle tire having a tread with a directionally bound tread pattern, wherein an inner circumferential groove (2) is provided on both sides of a central circumferential rib (1) and each inner circumferential groove (2) has a smaller width than the width of the circumferential rib (1); and an outer circumferential groove (5) is disposed on both sides of a central plane (CL) of the tire in a shoulder transition region such that an intermediate tread zone (3) is formed between the inner circumferential groove (2) and the outer circumferential groove (5), the outer circumferential grooves (5) having a smaller width than the width of the inner circumferential grooves (2), wherein oblique grooves (6) are provided in each intermediate tread zone (3), are curved in arc-shaped manner in the direction of the shoulder transition region (4) and include an inwardly disposed oblique groove section which extends in a direction of running, each oblique groove (6) opening to the outer circumferential groove (5) and the inwardly disposed oblique groove section of each oblique groove opening to the preceding oblique groove (6).

2. A vehicle tire in accordance with claim 1, wherein an arc-shaped intermediate groove (7) is provided between two of the oblique grooves (6) and extends between an inwardly disposed oblique groove section and an outer circumferential groove (5).

3. A vehicle tire in accordance with claim 1, wherein the outer circumferential grooves (5) each consist of sections which are laterally displaced relative to one another, the oblique grooves (6) opening into the outer circumferential groove (5) in a region where the displaced sections meet.

4. A vehicle tire in accordance with claim 1, wherein the oblique grooves (6) continue in the shoulder region (4) in the form of curved shoulder grooves (8) which reduce in depth outside of the tire contact patch (10) and extend at an angle of approximately 70° to 90° to the central plane (CL) of the tire.

5. A vehicle tire in accordance with claim 4, wherein the width of the outer circumferential grooves (5) is approximately 40% of the width of the inner circumferential grooves (2), and the width of the oblique grooves is approximately 40% to 60% of the width of the inner circumferential grooves (2), and the width of the shoulder grooves (8) is approximately 60% to 80% of the width of the inner circumferential grooves (2) at least adjacent to the outer circumferential grooves (5), with the width of the inner circumferential grooves (2) being approximately 10% of the half tread width (TW/2).

6. A vehicle tire in accordance with claim 1, wherein each of the oblique grooves (6) disposed in the intermediate tread zone run out, after the oblique groove has opened into the respectively preceding oblique groove, into groove end (9), the depth of the groove end reducing to zero in the direction of running.

7. A vehicle tire in accordance with claim 1, wherein the central circumferential rib (1) is loosened up by curved blind grooves (11) which are displaced relative to one another in the circumferential direction.

8. A vehicle tire in accordance with claim 1, wherein the tread intermediate zone (3) extends over approximately one third of the half tread width (TW/2) and is spaced from the tread center line (CL) approximately by 25% to 30% of the half tread width (TW/2).

* * * * *